United States Patent [19]

Leshik

[11] 4,034,927
[45] July 12, 1977

[54] CONTINUOUS LOOP TAPE CARTRIDGE
[75] Inventor: Edward Alexander Leshik, London, England
[73] Assignee: Hellermann Cassettes Limited, Crawley, England
[21] Appl. No.: 618,286
[22] Filed: Sept. 30, 1975
[30] Foreign Application Priority Data
Oct. 1, 1974 United Kingdom ............ 42554/74
[51] Int. Cl.² ....................................... B65H 19/20
[52] U.S. Cl. ...................... 242/56 R; 242/55.19 A; 156/506
[58] Field of Search .................. 242/55.19 A, 55.18, 242/74, 56 R, 56 A, 58.4; 226/95, 97; 156/502, 504–506

[56] References Cited
U.S. PATENT DOCUMENTS

| 1,627,198 | 5/1927 | Penin | 352/128 |
| 1,629,154 | 5/1927 | DeYbarrondo | 242/74 |
| 3,620,467 | 11/1971 | Isom | 242/55.19 A |
| 3,770,551 | 11/1973 | Cerrol | 242/56 R |
| 3,966,134 | 6/1976 | Matsuda | 242/55.19 A |

Primary Examiner—Leonard D. Christian
Attorney, Agent, or Firm—Lawrence E. Laubscher

[57] ABSTRACT

A tape-pack carrier for a continuous loop tape cartridge comprises a hub for receiving the tape as a pack coiled therearound and to be mounted non-rotatively within the cartridge and an opening in the peripheral wall of the cartridge for the tape to be pulled through from the innermost turn of the pack causing the pack to rotate around the hub. A supporting means extends radially from the hub for supporting the tape pack over one side of the pack, particularly while the tape is being wound onto the hub. Cartridges into which the tape-pack carrier is non-rotatively fitted include guide means for guiding the tape along a fixed path from the innermost turn of the pack and back onto the pack as the outermost turn.

18 Claims, 4 Drawing Figures

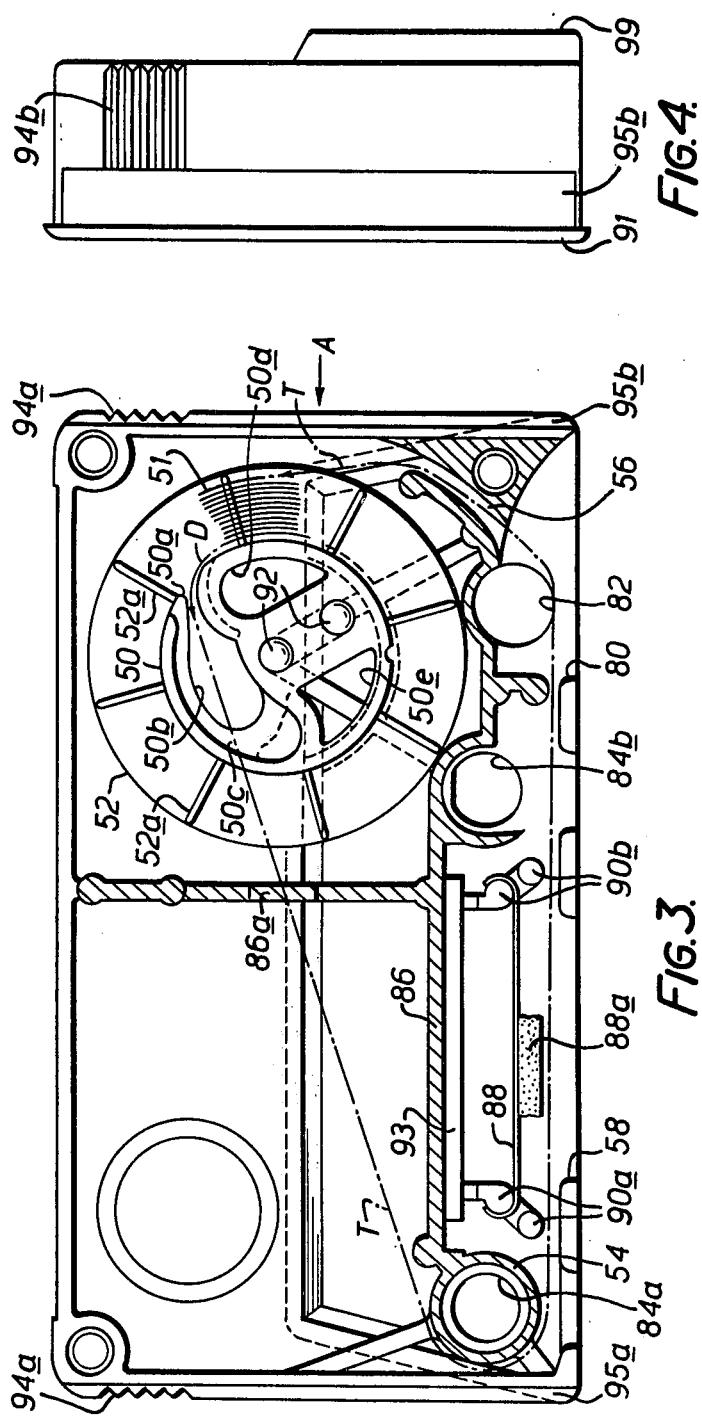

CONTINUOUS LOOP TAPE CARTRIDGE

BACKGROUND OF THE INVENTION

This invention relates to a continuous-loop tape cartridge with particular reference to cartridges for magnetic recording tape intended for use in audio players or machines, whether for play-back of an audio recording already present on the tape or for making an audio recording on the tape. The invention relates especially to a tape-pack carrier to be fitted within the cartridge.

One application of the invention is to the conventional so-called 8-track stereo cartridge for use in conventional play-back machines fitted in motor cars. Another application of the invention is to a cartridge of very small dimensions, which may be described as a miniature or "mini" cartridge.

Cartridges are known in which the tape follows a continuous-loop path from the innermost turn of a coiled pack of tape and back onto the tape pack as the outermost turn. In use the tape is pulled by a drive capstan from the innermost turn, causing the pack of tape to rotate.

Such known cartridges suffer various disadvantages which arise during manufacture, in particular during the winding of the tape onto the hub of the tape-pack carrier which is fitted into the cartridge. This is because the carrier does not include suitable surfaces for supporting the tape pack sufficiently well for winding, particularly at high speeds.

SUMMARY OF THE INVENTION

An object of this invention is to provide a tape-pack carrier which avoids these difficulties.

Accordingly, the present invention provides a tape-pack carrier for a tape cartridge, the carrier comprising a hub for receiviing the tape as a pack coiled therearound, an opening in the peripheral wall of the hub for the tape to be pulled through from the innermost turn of the pack causing the pack to rotate around the hub, and a supporting means extending radially from the hub for supporting the tape pack, when received by the hub, over one side of the tape pack and against movement of the tape pack in one direction axially of the hub.

Also, this invention provides a tape cartridge comprising a tape-pack carrier mounted non-rotatively, and guiding means for guiding the tape in a continuous loop through said opening in the peripheral wall of the hub from the innermost turn of the tape-pack, when received upon said hub, and back onto said pack as the outermost turn.

Conveniently the supporting means of the tape carrier may comprise a flange, for example annular, extending the full circumference of the hub.

In the case of a cartridge for playing on conventional stereo-8 machines, the guiding means will include a freely rotatable wheel around which the tape will run on a return path to the tape-pack, and an aperture will be provided in an adjacent edge of the cartridge for access of a drive capstan of the play-back machine to press the tape against this wheel for driving the tape.

In one embodiment of "mini" cartridge to be described herein, an aperture is provided in a base wall of the cartridge for entry of a drive capstan of a play-back machine to a position within the continuous loop of tape. An aperture is provided in an adjacent edge of the cartridge for access of a pressure wheel of the machine to press the tape against the drive capstan.

The provision of the tape supporting means of the tape-pack carrier facilitates winding of a length of tape onto the hub because the supporting means supports one side of the tape-pack during winding. Tape may be wound onto the hub, then the loaded hub fitted into the cartridge shell.

In this connection, this invention provides a method of manufacturing a tape cartridge, the tape cartridge being as defined above, and the method comprising winding a length of tape onto said hub to form said pack of tape, said supporting means supporting one side of the tape pack during winding, splicing together the ends of said tape, hold the tape in a continuous loop in the same configuration as determined by the guiding means of the cartridge, then approaching a cartridge shell to the tape-loaded hub for the hub to seat within the shell and the loop of tape to engage the guiding means. This method may be carried out automatically.

DESCRIPTION OF THE DRAWING

Embodiments of the invention will now be described, by way of examples only, with reference to the accompanying drawings, in which:

FIG. 3 is a plan view, similar to that of FIG. 1, of a "mini" cartridge; and

FIG. 4 is an end view taken in the direction of arrow A of FIG. 1.

DETAILED DESCRIPTION

Figure 1:
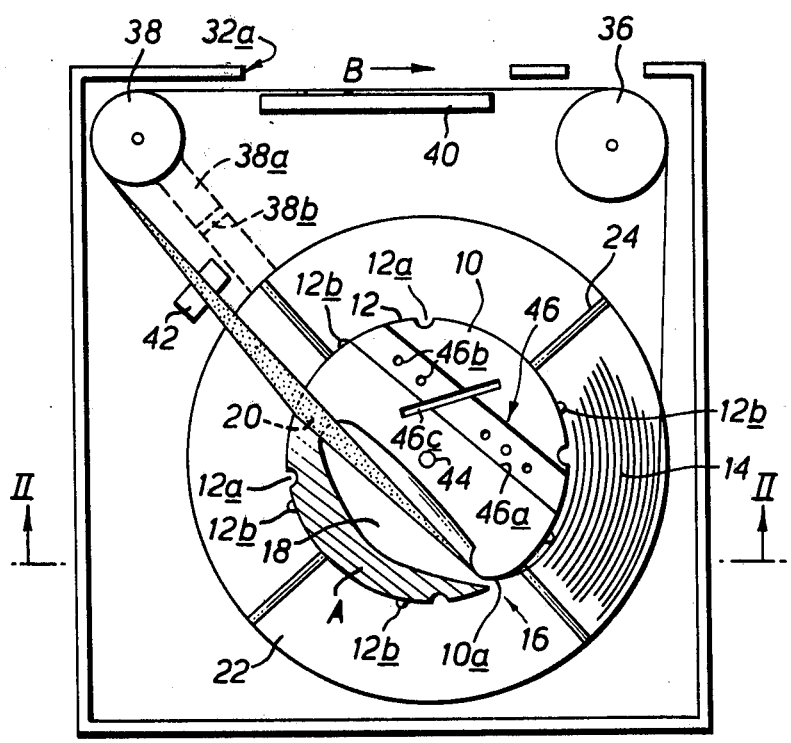
FIG. 1 is a plan view of an 8-track stereo cartridge, shown with the lid thereof removed to show internal details of the cartridge.
Figure 2:
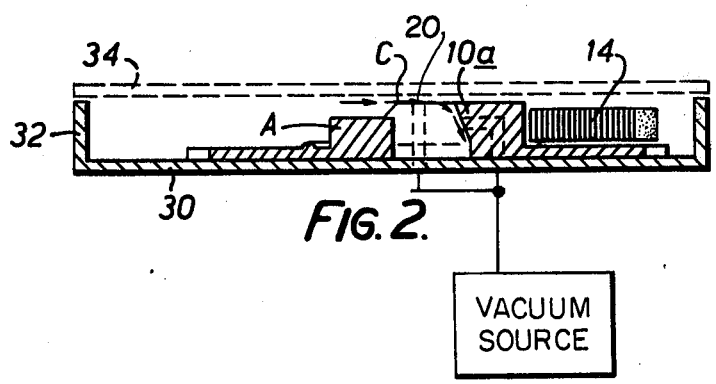
FIG. 2 is a section on the line II—II of FIG. 1.

Referring to FIGS. 1 and 2 of the drawings, there is shown an 8-track stereo cartridge comprising a tape-pack carrier loaded with magnetic tape, and associated components for guiding the tape in a continuous loop from the innermost turn of the pack, past a sensing head of an audio play-back machine (not shown) for which the cartridge is intended, and back on to the pack as the outermost turn. The tape-pack carrier comprises a hub 10 having a cylindrical peripheral wall 12 for receiving tape 14, preferably lubricated, as a pack coiled around the hub. The peripheral wall is provided with an opening 16 for the tape to be pulled through from the innermost turn of the pack, causing the latter to rotate relative to the non-relatively mounted hub. A space or cut-out 18 is provided within the hub where the tape twists as shown until it lies in a plane transverse to the axis of the pack and across a tape running surface 20 of the hub, the opening 16 and space 18 being open to the top of the hub. The tape-pack carrier further comprises an annular flange 22 formed integral with the hub to form a platform for supporting the lower side of the tape-pack. The flange 22 is formed on its upper surface with a plurality of radial ribs 24, each of uniform height throughout its length, and the tape-pack rests on these ribs.

It will be noted, particularly from FIG. 2, that the section A of the hub, shown shaded and disposed opposite spur 10a around which the tape runs into the opening 16 and extending as far as the running surface 20, is lower in height than the remainder of the hub. Also, the spur 10a, around which the tape leads from the innermost turn, is inclined from the vertical in such a sense that the tape begins to twist in running around this surface, the same twist being continued within the space 18. The purpose of these features will be explained later in this specification, likewise the purpose of semicircular cut-outs 12a formed in the peripheral wall 12 of the hub.

The cartridge, in which the tape-pack carrier is non-relatively mounted, includes a bottom wall 30 and an integral peripheral wall 32 and is completed by a lid 34 shown in outline in FIG. 2. Two running surfaces 36 and 38 are provided on the bottom wall 30 for the tape, the first running surface 36 being a freely rotatably mounted pressure wheel for co-operation with the driving capstan (not shown) of the play-back machine, and the second running surface 38 comprising a fixed cylindrical post. As shown, the tape leads from the inner turn of the tape-pack, twists through 90° within the cut-out 18 before reaching a running surface 42, then twists back to a vertical plane to pass around the fixed post 38, the pressure wheel 36 and back on to the tape-pack as the outermost turn. The peripheral side wall 32 of the cartridge is apertured at 32a to enable access of a sensing head of the play-back machine to co-operate with the tape. A foam plastic pad 40, provided with a smooth face against the tape, is provided to support the tape opposite the sensing head. The running surface 42 projects from the bottom wall 30 a sufficient distance to hold the tape spaced above the tape-pack as it passes from the innermost turn to the cylindrical post 38. In a modification, the running surface 42 may hold the tape spaced above the hub at 20 also.

Electroplated or sputtered coatings may be provided on the various surfaces of the tape-pack carrier and of the rest of the cartridge on which the tape slides in order to reduce the frictional forces to which the tape is subjected, namely surfaces 12, 24, 42 and 38.

In running use of the cartridge, the tape is driven in the direction of the arrow B by the rotating capstan of the play-back machine which presses the tape against the pressure wheel 36. This pulls the tape from the innermost turn of the pack, causing the entire pack to rotate relative to the hub 10. A degree of relative slipping results between every pair of adjacent turns in the pack and the tape, after leading past the sensing head and around the fixed post 38, returns to the pack as the outermost turn.

A preferred method of manufacturing the cartridge of FIGS. 1 and 2 will now be described. Firstly the tape-pack carrier, separate from the rest of the cartridge, is loaded with tape by rotating the carrier about the axis of the hub. The hub may be provided, as shown, with a central aperture 44 for receiving a spindle during this operation, or alternatively two diametrically opposed apertures for spaced spindles may be provided, enabling the cut-out 18 to extend across the central region of the hub. The tape-pack carrier can be loaded entirely automatically. Firstly, the lead end of the tape must be brought to the tape-pack carrier so as to project radially inwards through the opening 16: this is effected by moving the end of the tape, lying in a plane parallel to the platform 22, across and only slightly above the section A of the hub. Because section A is lower in height than the rest of the hub, the tape eventually strikes the inclined wall of the spur 10a and is deflected to the position shown which is parallel and flat against the inclined wall of the spur. Successive positions of the tape during this progression are shown by arrows C in FIG. 2. The free end of the tape is then held against the tape running surface 20 of the hub and the tape can then be wound around the hub by rotating the carrier. Ducts may be provided through the hub to terminate at surfaces 20 and 10a to hold the end of the tape in place by applying a vacuum through these ducts from the winding equipment.

During rotation, the top of the hub is held against a flange provided on the winding machine and the tape-pack which develops is constrained between this flange and the platform 22 to enable high speed winding. The winding machine flange will have projecting therefrom a series of semi-circular section pins co-operating with the semi-circular section grooves 12a of the hub, except that during winding the curved surface of the pins will face radially outwards so as effectively to increase the circumference of the innermost turn of the tape-pack.

When winding is finished, the automatic machinery may take out the opposite ends of the tape and splice them together, ending with the tape held out in a continuous loop shaped and dimensioned exactly as the tape path in the cartridge of which it is to form a part. The cartridge is then located beneath the tape carrier and the latter, with tape held out in the loop, is lowered into the cartridge so that the tape will engage around the bearings 36 and 38. It is necessary for the tape carrier and bottom wall of the cartridge to be provided with co-operating abutments to prevent subsequent rotation of the tape carrier. The pins of the winding machine flange are then rotated through 180° to release the pack for running and to separate the loaded carrier from the winding machine.

The tape carrier can be manufactured as a one-piece moulding from synthetic plastic material such as acetal, perhaps loaded with antistatic or antifriction fillers. Conveniently, the fixed post 38 may be moulded integral with the carrier at the end of a extension 38a shown in outline in FIG. 1. This extension must be formed with a hinge 38b so that the post 38 can be flexed temporarily to a position below the platform 22 so as not to interfere with the winding of the tape.

A splicing block can be moulded into the top of the hub, as shown at 46, for manually splicing the ends of the tape. This block includes a groove 46a for receiving the tape and provided with ducts 46b for applying a vacuum from underneath to hold the tape in position. The block also includes a groove 46c for receiving a cutting blade. Preferably, where space permits, the splicing block should be formed in the surface 20.

Because the peripheral wall 12 of the hub is vertical and not formed with any circumferential groove (as in rotating-hub type continuous loop cartridges), the tape can be thinner because there is no danger of the outer turns of tape pressing the inner turns into the groove and permanently deforming the tape. Also the vertical peripheral wall enables reliable and repeatable winding conditions because there are no inner turns liable to deformation in a variable manner. The pack of tape should not in any event be such that the inner diameter is too small relative to the outer diameter, otherwise problems may occur in the running of the tape. An advantage of the inclined wall at the spur 10a is that this prevents the tape, during running, riding up to and possibly over the top of the hub wall. This inclined wall can with advantage depart from the straight-line profile, for example it may be slightly convex or concave, to assist the tape in running on the central part of this wall.

With the tape-pack carrier and tape path shown, the cartridge can be of less depth than in the rotating-hub type continuous loop cartridges, or otherwise the cartridge can be of the same depth and formed so that several can be "nested" or even clipped together in a stack, being provided themselves with interengaging formations on their top and bottom surfaces.

The lid 34 of the cartridge includes ribs for constraining the tape-pack, for example radial ribs matched to the radial ribs 24 on the platform 22.

The hub may be provided as shown with axially extending ribs 12b at spaced intervals therearound, with the effect of reducing the surface area in contact with the inner turn of the tape. The post 36 may also be provided with such ribs.

Referring now to FIGS. 3 and 4 of the drawings, there is shown a miniature loop tape cartridge. The path for the magnetic tape is shown by the chain-dotted line T but for clarity in the drawing only part of the actual tape is shown, namely at 11. The cartridge comprises a rectangular shell having a base wall and a peripheral wall, the peripheral wall being continuous apart from some apertures disposed in a front edge of the cartridge, which apertures will be described later in this specification. The cartridge comprises a stationary hub having a cylindrical surface 50, around which a pack 51 of tape is wound. The hub further comprises a stationary hub having a cylindrical surface 50, around which a pack 51 of tape is wound. The hub further comprises a supporting means for the tape-pack in the form of an integral annular flange 52, with radial ribs 52a on its upper surface. The flange 52 is circular as shown, but may instead be generally square, conforming to the shape and size of the compartment in which is is fitted, providing then the maximum size of the pack of tape that can be supported during loading. The cylindrical surface 50 is provided with a slot 50a, which is as shown inclined in the vertical plane, through which the tape leads from the innermost turn of the pack in the direction of arrow D. Slot 50a leads into a recess 50b within which the tape twists through an angle up to but exceeding 90° in order to pass over the top of the hub at 50c and also to pass over the pack of tape. A running surface is provided at 86a for the tape to run over in a horizontal or near horizontal plane at this point and preferably this running surface is positioned sufficiently high above the base wall of the cartridge so that the tape passes over the hub and tape-pack without touching them. Preferably the tape twists though less than 90° in passing from the innermost turn of the pack to the running surface 86a and preferably the running surface 86a is inclined to correspond to the disposition of the tape at this point. The hub is further provided with through-apertures at 50d, 50e to make the hub easier to mould because all of the walls thereof are of equal thickness.

The cartridge further comprises a cylindrical tubular boss 54 around which the tape runs, having twisted to return to a vertical plane in passing from the running surface 86a to the boss 54. The cartridge also includes a curved channel 56 through which the tape runs to return to the tape pack as the outermost turn. In running from the boss 54 to the entry of channel 56, the tape follows a path closely adjacent the front edge of the cartridge. The channel 56 is carefully disposed and profiled to ensure that the tape follows its natural curve from a drive capstan of the player, the capstan entering the cartridge through an aperture 82 in the base wall of the cartridge. Also the channel 56 is positioned and profiled to ensure that the tape will always be positioned closer to the front edge of the cartridge than the front edge of the aperture 82, so that the capstan will always enter the cartridge on the correct side of the tape.

The front edge of the cartridge includes a window 58 for access to the tape of the magnetic head of the player, and a window 80 for the pinch wheel of the player. The base wall of the cartridge is provided with apertures 84a, 84b to locate with reference bosses, which may be provided on some players to locate the cartridge in correct position, and is provided with a flat area within the cartridge around the periphery of each of these apertures. The reference bosses on such a player include enlarged heads and the player includes a spring bias which urges the cartridge forward for these flat areas of the base wall to engage under the enlarged heads of the reference bosses.

The cartridge includes internal walls 86 (shown hatched) which extend from the base wall but terminate a short distance from the top of the peripheral wall of the cartridge. These internal walls 86 act as dust traps and the running surface 86a is formed on the top edge of the appropriate such wall. A metal spring 88, carrying a pad 88a of cellular plastic, is engaged between spaced pairs of posts 90a and 90b: the magnetic head of the player presses the tape against this pad in use of the cartridge. A shield 93 of high magnetic impermeability is provided on the front surface of the dust wall 86 and the pad 88a may be secured to this shield, in which case the metal spring 88 is dispensed with. The cartridge is formed as a one-piece moulding of plastic material, apart from the lid of the cartridge (shown by reference numberals 91 in FIG. 2), the spring and pad 88 and 88a, the shield 93 and the hub 50 with integral flange 52. The lid 91 is another one-piece moulding, and the hub 50 with integral flange 52 is a further one-piece moulding. The hub engages with the cartridge by means of two pegs 92 on the cartridge base wall engaging complementary bores in the hub.

Referring particularly to FIG. 4, the base wall includes a lowered area 99 in which the apertures 82, 84a and 84b are formed and this lowered wall section acts as the reference plane for proper location of the cartridge upon the tape deck of the player.

Serrated finger grips 94a, 94b will be noted on the opposite end edges of the cartridge towards the back thereof and also provided on the opposite end edges are respective grooves 95a, 95b for use in engaging with a carrier for the cartridge which is provided on the play-back machine.

The mini-cartridge of FIGS. 3 and 4 may be manufactured by an automatic process identical with the method described above in connection with the cartridge of FIGS. 1 and 2, and for this purpose the portion of the hub from 50c around the opening 50a is lower than the rest.

One player on which the mini-cartridge of FIGS. 3 and 4 may be used is described in the Leshik patent application No. 618,225 filed September 30, 1975. The cartridge has a playing time of approximately 6 minutes on a single track, which is approximately equivalent to both sides of an ordinary "singles" record disc. The cartridge shown has overall dimensions of 54 m.m. length, 29 m.m. width and 11 m.m. depth.

What is claim is:
1. A tape cartridge, comprising a. a housing including base, peripheral wall and lid portions defining a chamber;
b. a tape pack carrier mounted non-rotatively within said housing chamber on said base, said tape pack carrier including
   1. a cylindrical hub; and
   2. tape supporting means extending radially of said hub, said supporting means being arranged on said base portion, said hub extending upwardly from said base and said supporting means;
   3. said hub containing a recess arranged generally centrally therein, and a slot extending generally radially inwardly in said hub in communication with said recess;
c. tape guiding means arranged within said housing chamber adjacent the housing peripheral wall; and
d. a continuous length of tape helically wound in pack form around said hub, the lower end of said tape pack being supported on said supporting means, a portion of the tape passing, in succession, from the innermost turn of the tape pack through the slot, in twisted relation through an angle of 90° through said recess to a plane normal to the axis of the hub and pack at a location diametrically opposite said slot, in twisted relation back through the angle of 90° toward its original vertical orientation, around said guide means, and back upon the tape pack as the outermost turn thereof;
e. the peripheral wall of said housing containing at least one aperture, whereby access is afforded to the tape for a sensing head.

2. A cartridge as claimed in claim 1, in which the top of the hub is provided with a tape-running surface for the tape to run upon after crossing said recess.

3. A cartridge claimed in claim 2, in which said hub includes a duct opening onto said tape-running surface, for the application of a vacuum to hold the tape to said surface.

4. A cartridge as claimed in claim 1, in which said supporting means comprises a flange extending the full circumference of said hub.

5. A cartridge as claimed in claim 4, in which said flange is annular.

6. A cartridge as claimed in claim 4 in which said flange is provided with radially extending ribs on the surface thereof which supports the tape pack.

7. A cartridge as claimed in claim 1, in which said slot is inclined to the axis of said hub.

8. A cartridge as claimed in claim 1, in which at least one groove is formed in the cylindrical surface of said hub, said groove extending axially of said hub.

9. A cartridge as claimed in claim 1, comprising tape splicing means disposed on top of said hub.

10. A cartridge as defined in claim 1, in which the hub is provided with a plurality of ribs spaced apart around the hub and extending axially of the hub to reduce the surface area of the hub which contacts the innermost turn of the tape pack.

11. A cartridge as claimed in claim 1, in which said guiding means includes first and second tape-running surfaces over which the tape passes in succession with the tape lying in a plane parallel to the hub axis throughout its path from said first tape-running surface to the outermost turn of the tape-pack.

12. A cartridge as claimed in claim 11, in which said first tape-running surface comprises a fixed post.

13. A cartridge as claimed in claim 11, in which said first tape-running surface is provided with ribs extending parallel to the hub axis and spaced apart in the running direction of the tape in order to reduce the area of said surface in running contace with the tape.

14. A cartridge as claimed in claim 11, in which said second tape-running surface comprises a wheel mounted for free rotation about its axis.

15. A cartridge as claimed in any one of claim 11, in which said guiding means comprising a further tape-running surface for the tape to run over in passing from said pack to said first tape-running surface, said further tape-running surface lying in a plane inclined at an angle up to 90° to the hub axis so that the tape twists through up to 90° in passing from the innermost turn of the tape pack to said further tape-running surface and then the tape twists back to a plane parallel to the hub axis in passing from said further tape-running surface to said first tape-running surface.

16. A cartridge as claimed in claim 15 in which said further tape-running surface is disposed to hold said tape above and out of contact with the hub and tape pack in passing from said tape pack to said first tape-running surface.

17. A cartridge as claimed in claim 1, comprising an aperture in base portion for entry of a drive capstan of a play-back machine, when the cartridge is received by said machine, to a position within the continuous loop of tape, and an aperture in said peripheral wall portion of the cartridge for access of a pressure wheel of the machine to press the tape against the drive capstan.

18. A method of manufacturing a tape cartridge, comprising the steps of:
a. providing a housing including a base, a peripheral wall extending upwardly from the base and a removable lid, said peripheral wall containing at least one aperture affording access for a sensing head;
b. providing a tape pack carrier which includes
   1. a cylindrical hub, and
   2. tape supporting means extending radially of said hub, said hub extending upwardly from said supporting means,
   3. said hub containing a recess arranged generally centrally therein, having a top end remote from said tape supporting means and a slot extending generally radially inwardly in said hub in communication with said recess and having an open end at the top of said hub;
   4. said slot having two opposite, inclined sides, one side being higher than the other;
c. providing tape guiding means arranged within said housing chamber adjacent the housing peripheral wall;
d. providing a length of tape having opposite free end portions;
e. moving one of said free end portions of tape across said top of said hub and across said open end of said slot, said free end portion of tape lying in a plane parallel to the top of said hub;
f. moving further said one free end portion of tape across said open end of said slot until said one free end portion of tape engages said higher side of the slot;
g. deflecting said one free end portion of the tape into said slot upon engaging said higher side of the slot;
h. rotating said tape-pack carrier so as to wind said length of tape around said hub to form a pack of tape wound around said hub;
i. employing said tape supporting means to support one side of said tape pack as it develops;

j. splicing together the free ends of said tape length, to form a continuous loop, and holding the tape so that it extends in succession, from the innermost turn of the tape pack through the slot, in twisted relation through an angle of 90° through said recess to a plane normal to the hub axis and a location diametrically opposite said slot, in twisted relation back through the angle of 90° towards its original vertical orientation and back upon the tape pack as the outermost turn thereof;

k. lowering said tape pack carrier and tape into said housing so that said tape-supporting means sits on said housing base and said tape engages said tape guiding means;

l. securing said tape pack carrier against rotation about its axis relative to said base; and m. applying said lid to close said housing.

* * * * *